United States Patent
Thomsen et al.

(10) Patent No.: US 10,481,986 B2
(45) Date of Patent: *Nov. 19, 2019

(54) AUTOMATIC ADOPTION OF PARALLELIZED DATABASE GARBAGE COLLECTION

(71) Applicant: SAP SE, Walldorf (DE)

(72) Inventors: Dirk Thomsen, Berlin (DE); Christoph Roterring, Walldorf (DE); Thorsten Glebe, Leimen (DE)

(73) Assignee: SAP SE, Walldorf (DE)

( * ) Notice: Subject to any disclaimer, the term of this patent is extended or adjusted under 35 U.S.C. 154(b) by 155 days.

This patent is subject to a terminal disclaimer.

(21) Appl. No.: 15/647,045

(22) Filed: Jul. 11, 2017

(65) Prior Publication Data

US 2019/0018742 A1     Jan. 17, 2019

(51) Int. Cl.
   *G06F 11/14*      (2006.01)
   *G06F 12/02*      (2006.01)
   *G06F 16/23*      (2019.01)

(52) U.S. Cl.
   CPC ...... *G06F 11/1474* (2013.01); *G06F 11/1471* (2013.01); *G06F 12/0253* (2013.01); *G06F 16/2358* (2019.01); *G06F 16/2365* (2019.01); *G06F 2201/80* (2013.01); *G06F 2201/805* (2013.01); *G06F 2201/82* (2013.01); *G06F 2212/1032* (2013.01); *G06F 2212/1044* (2013.01)

(58) Field of Classification Search
   CPC ............. G06F 11/1474; G06F 16/2358; G06F 16/2365; G06F 11/1471; G06F 12/0253
   See application file for complete search history.

(56) References Cited

U.S. PATENT DOCUMENTS

| | | | |
|---|---|---|---|
| 2012/0109895 A1* | 5/2012 | Zwilling | G06F 11/1471 707/648 |
| 2012/0137101 A1* | 5/2012 | Arcese | G06F 9/5016 711/170 |
| 2015/0339366 A1* | 11/2015 | Laiho | G06F 16/273 707/610 |
| 2018/0217779 A1* | 8/2018 | Stephens | G06F 3/0652 |

* cited by examiner

*Primary Examiner* — Matthew M Kim
*Assistant Examiner* — Indranil Chowdhury
(74) *Attorney, Agent, or Firm* — Jones Day

(57) ABSTRACT

Recovery of a database system by taking the database system offline is initiated. Thereafter, recovery operations specified by a redo log of the database system are replayed. A cleanup log is generated that identifies cleanup operations occurring during the replay of the recovery operations for garbage collection. Concurrent with the startup of the database, garbage collection of the cleanup operations as specified in the database savepoint is initiated. In addition, concurrent with the replay of the recovery operations, garbage collection of the cleanup operations specified by the cleanup log is initiated. The amount of parallelization of the garbage collection can be varied based on utilized processor resources. The database system is later brought online after all of the recovery operations are replayed.

20 Claims, 8 Drawing Sheets

AUTOMATIC ADOPTION OF PARALLELIZED DATABASE GARBAGE COLLECTION

TECHNICAL FIELD

The subject matter described herein relates to enhanced techniques for selectively and automatically parallelizing garbage collection in a database based on availability of resources.

BACKGROUND

Database systems are susceptible to failure for a variety of reasons including both software and hardware related issues. As a result, recovery logs that record various operations performed by such database systems have been adopted. These recovery logs record various actions performed by the database systems which can be later replayed, if needed, as part of a recovery operation. Further, as part of such recovery, certain operations which have not been fully executed can be reverted or, if fully executed, might clean up or reorganize the data space. Such cleanup or undo operations are written to cleanup and undo log respectively during the execution of such operations. The execution of cleanup log is typically called 'garbage collection'.

SUMMARY

In a first aspect, recovery of a database system is initiated by taking the database system offline. Thereafter, recover operations specified by a redo log of the database system are replayed. A cleanup log is generated that identifies cleanup operations occurring during the replay of the recovery operations for garbage collection. Concurrent with at least one of the startup of the database or the replay of the recovery operations, garbage collection of the cleanup operations as specified in the database savepoint or by the cleanup log are initiated. The garbage collection is implemented by a plurality of garbage collection threads. Processor usage of the database system in connection with the garbage collection is monitored. Based on such monitoring, more garbage collector threads are added if the monitored processor usage is below a first pre-defined threshold. In addition, a current number of garbage collector threads is decreased if the monitored processor usage is above a second threshold. The database system can then be brought online after all of the recovery operations are replayed.

The current number of garbage collector threads can be maintained if an amount of garbage for collection is below a pre-defined amount.

The current number of garbage collector threads can be maintained if an amount of garbage for collection is not increasing.

The cleanup log can be passed to a history manager after it is generated and the history manager subsequently initiates the garbage collection of the cleanup operations specified by the cleanup log.

The garbage collection of the cleanup operations can continue subsequent to the database system being brought online.

The replay operations can be executed by recovery threads and the cleanup operations can be executed by garbage collection threads.

The database system can include a plurality of programmable processor cores and the garbage collection threads are striped such that each core executes a maximum of one recovery thread and one garbage collection thread.

At least one core can prioritize execution of the corresponding recovery thread over the corresponding garbage collection thread.

The database system can include an in-memory database storing data in main memory.

In an interrelated aspect, garbage collection of objects in a database system is initiated using a plurality of garbage collection threads. Processor usage of the database system in connection with the garbage collection is monitored. Based on such monitoring, more garbage collector threads are added if the monitored processor usage is below a first pre-defined threshold. In addition, a current number of garbage collector threads is decreased if the monitored processor usage is above a second threshold.

The current number of garbage collector threads can be maintained if an amount of garbage for collection is below a pre-defined amount and/or if an amount of garbage for collection is not increasing.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides more rapid database recovery by parallelizing garbage collection of cleanup operations necessitated by replay of the database.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to enhanced techniques for database recovery. In particular, the current subject matter is directed to database recovery in which garbage collection of cleanup operations are executed concurrently and/or subsequently with replay of database operations using, for example, a redo log.

Figure 1:
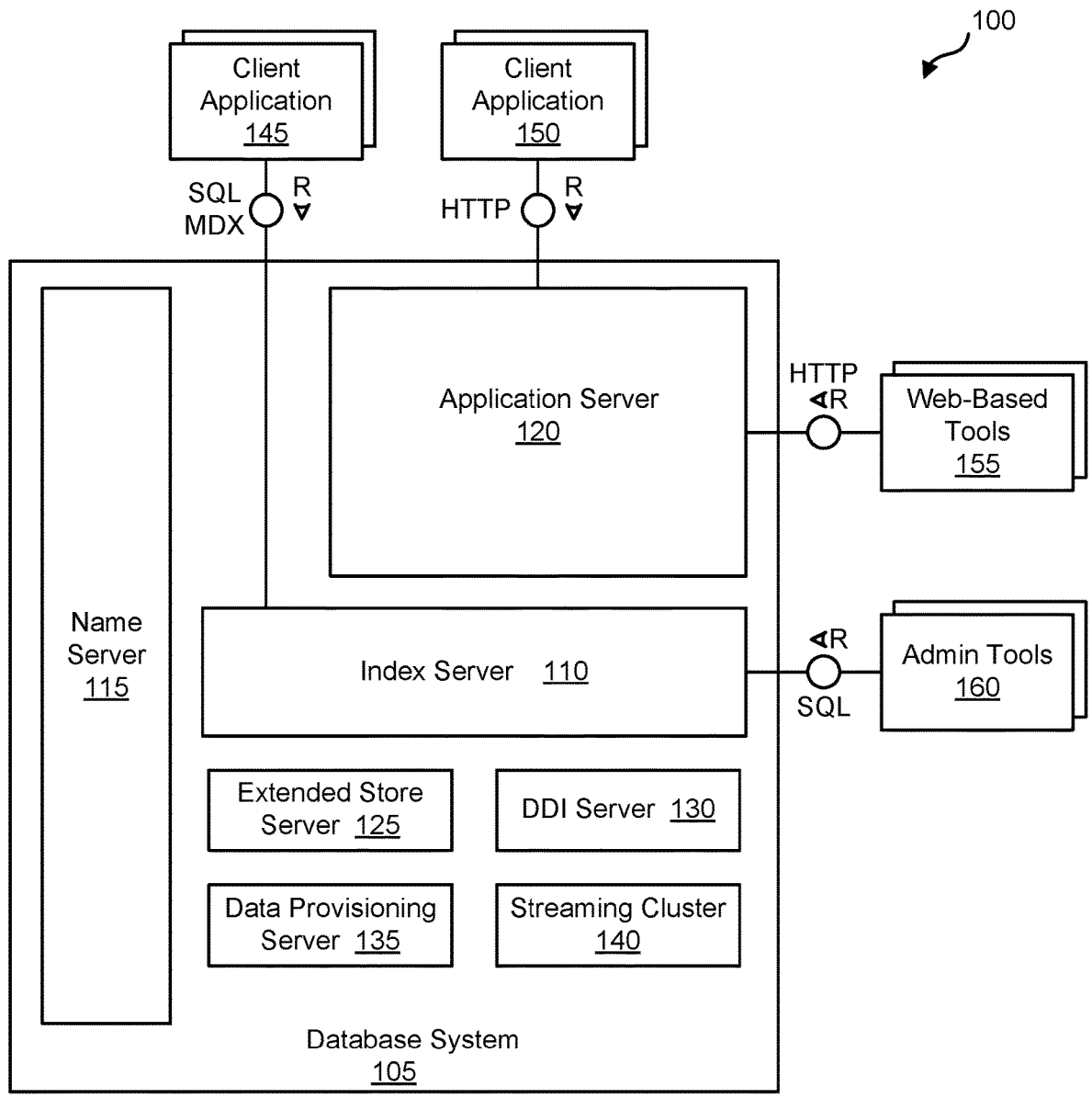
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also hosts the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
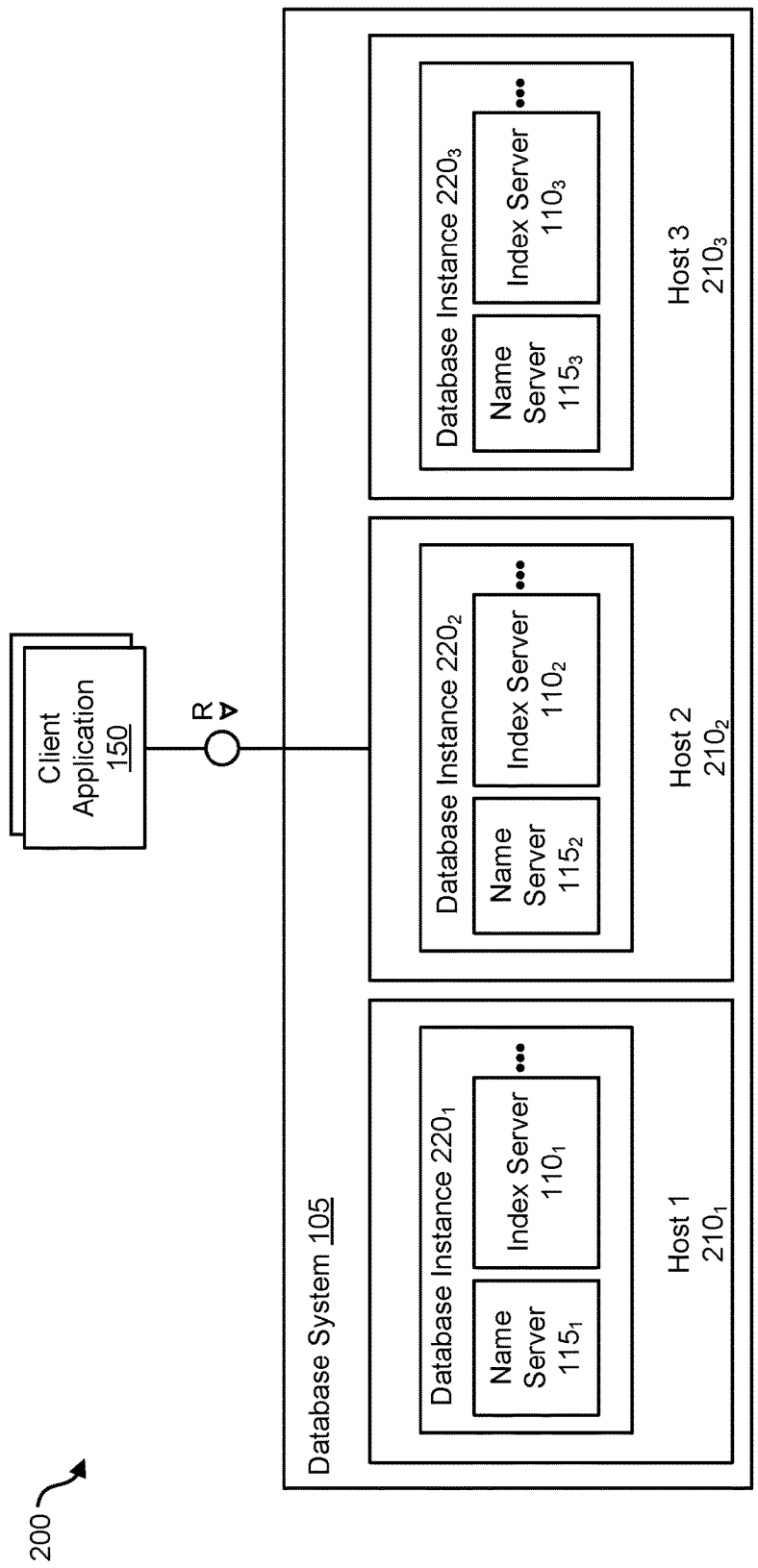
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 150 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
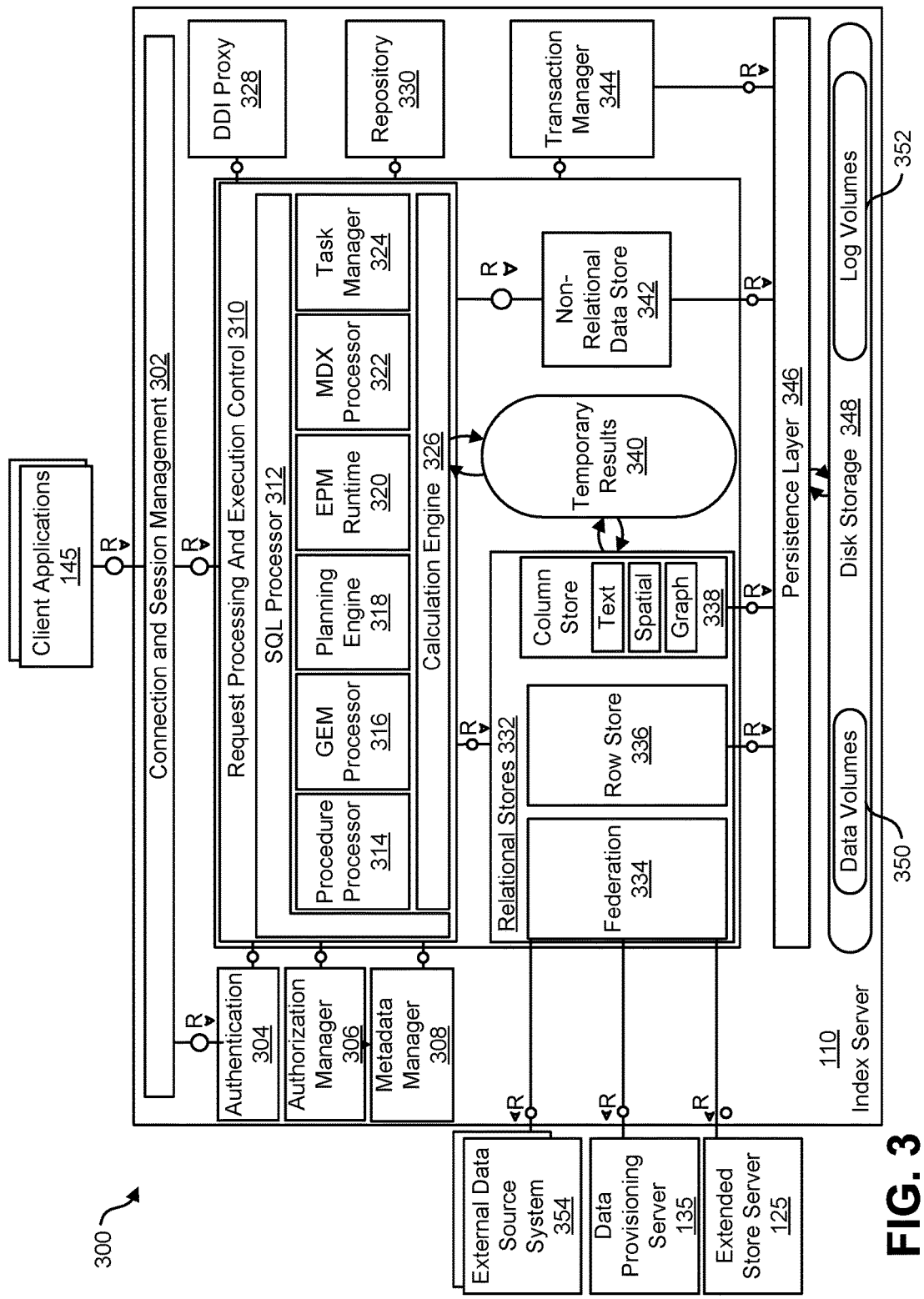
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 150. For each session, a set of parameters can be maintained such as, for example, auto commit settings or the current transaction isolation level.

Requests from the client applications 150 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 150 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 150 using the same network communication protocol. GEM statements can be sent using a built-in SQL system procedure.

The index server 110 can include an authentication component 304 that can be invoked with a new connection with a client application 150 is established. Users can be authenticated either by the database system 105 itself (login with user and password) or authentication can be delegated to an external authentication provider. An authorization manager 306 can be invoked by other components of the database system 105 to check whether the user has the required privileges to execute the requested operations.

Each statement can processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 150 can be e received by the SQL processor 312. Data manipulation statements can be executed by the SQL processor 312 itself. Other types of requests can be delegated to the respective components. Data definition statements can be dispatched to a metadata manager 308, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can stores relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can stores relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, undo and cleanup logs, shadow paging and savepoints. The persistence layer 346 can provide interfaces for writing and reading persisted data and it can also contain a logger component that manages a recovery log. Recovery log entries can be written in the persistence layer 346 (in recovery log volumes 352) explicitly by using a log interface or implicitly when using the virtual file abstraction. The recovery log volumes 352 can include redo logs which specify database operations to be replayed whereas data volume 350 contains undo logs which specify database operations to be undone as well as cleanup logs of committed operations which can be executed by a garbage collection process to reorganize the data area (e.g. free up space occupied by deleted data etc.).

The persistence layer 346 stores data in persistent disk storage 348 which, in turn, can include data volumes 350 and/or recovery log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

In many applications, data systems may be required to support operations on a 24/7 schedule, and data system providers may be required to guarantee a minimum amount of downtime, that is time during which a system is not able to fully support ongoing operations. When a system is required to ensure an agreed level of operational performance, it may be referred to as a high availability system ("HA"). One solution to guarantee substantially continuous uptime with no, or very little, downtime is to maintain one or more hot-standby systems. A hot-standby system, or a backup system, is a system that may be activated quickly in the event of a disruption causing one or more functions of a primary operational data system to fail. Such a disruption may be referred to as a disaster, and the process of restoring a data system to full operations may be referred to as disaster-recovery ("DR").

A hot-standby system may be an exact replica of a primary operational system that is capable of providing all the functions provided by the primary operational system, or a hot-standby may be a system that is capable of providing a minimum amount of essential functionality during the time required to restore the primary operational data system. The time it takes after a disaster to restore full, or minimum, functionality of a data system, for example by bringing a hot-standby online, is referred to as recovery time. In an effort to minimize recovery time, and thereby downtime, a hot-standby system is typically in a state just short of fully operational. For example, a system architecture may be implemented in which all functional systems of the hot-standby are active and operational, and all system and data changes or updates occur in the primary operational system and the hot-standby at the exact same time. In such a case the only difference in the two systems may be that the primary is configured to respond to user requests and the secondary is not. In other hot-standby systems one or more functions may be disabled until mission critical systems of the hot-standby are observed to be operating normally, at which time the remaining functions may be brought online.

In many applications, data systems may be required to provide prompt responses to users and applications that rely on the data managed by the data system. Providers and designers of data systems may be required to guarantee a minimum average throughput over time, or an average maximum response time. The speed with which a data system responds to a request from a user or an application may be dependent on many factors, but all systems are limited in the number of requests they can handle in a given period of time. When a data system manages a relatively large amount of data, and supports a relatively large number of users or applications, during high workloads a request may be queued, buffered or rejected until sufficient system resources are available to complete the request. When this happens, average throughput goes down and average response time goes up. One solution to such a problem is to distribute the workload across multiple processing systems. This is known as load balancing.

One drawback to load balancing and HA systems is that they may require additional processing systems, which in turn have a high cost. It is often the case with certain data systems supporting critical functions of an organization that additional systems are needed to perform both load balancing and HA functionality to efficiently support continuous operations. Given the redundant nature of DR systems, they are often left undisturbed unless a disaster occurs. Thus, in some circumstances, it is desirable to implement and maintain a combination high availability/disaster recovery (HA/DR) system with load balancing that includes both a primary operational system and a hot-standby system, and potentially one or more tertiary systems. Such a combination system allows for load balancing of workload between the processing systems of both the primary operational system and the hot-standby system, without disrupting the ability of the HA/DR system to assume primary functionality in the event of a disaster.

Figure 4:
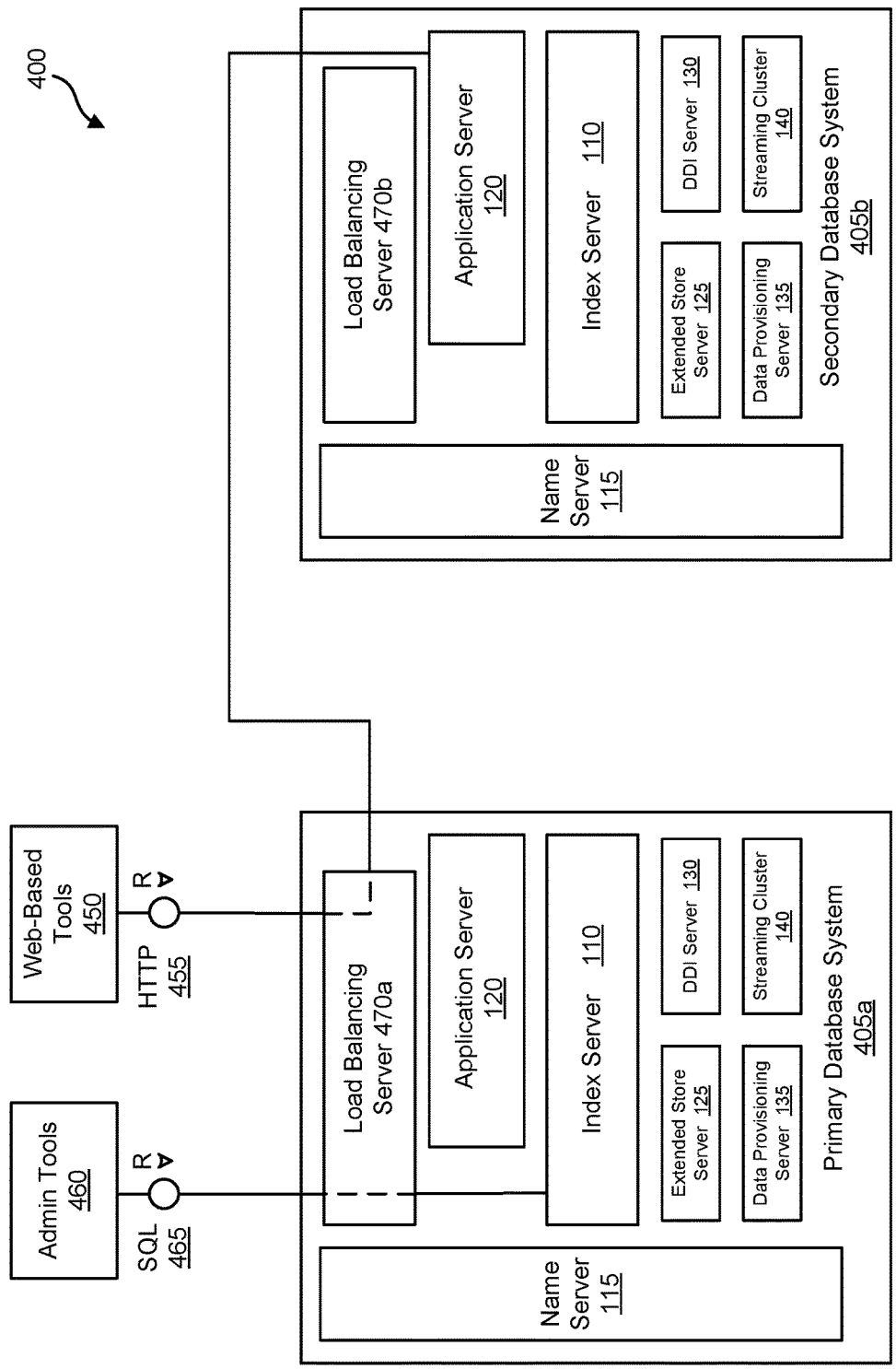
FIG. 4 is a functional flow diagram illustrating an architecture to support load balancing between a primary database system and a secondary database system.

FIG. 4 is a functional flow diagram illustrating an architecture 400 to support load balancing between a primary database system, or primary system 405a and a secondary database system, or secondary system 405b, which serves as hot-standby to primary system 405a. Each of the primary system 405a and the secondary system 405b may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary system 405a and secondary system 405b may include a load balancing functionality. Such load balancing functionality may for example be contained within a distinct load balancing server 470a or 470b. But, such load balancing functionality may be managed by any suitable processing system. For example, the application server 120 of the primary system may also manage the load balancing of requests issued to the application server of the primary system 405a, sending requests to the secondary system 405b as necessary to maintain a well distributed workload.

As depicted in FIG. 4, each of the primary system 405a and the secondary system 405b includes a load balancing server 470a and 470b which respectively receive requests from user applications directed to the primary system 405a or the secondary system 405b. Such request may come from either admin tools 460 or web-based tools 450, or any other user application. Upon receiving a request a load balancing server, e.g. 470a, determines how to distribute the workload. As depicted load balancing server 470a routes an SQL request 465 from admin tools 460 to the index server 110 of the primary system 405a, while routing an HTTP request 455 from web-based tools 450 to the application server 120 of the secondary system 405b.

Load balancing of resources between a primary system 405a and a secondary system 405b can give rise to a number of complicating issues. For example, if either of the requests 455, 465 requires writing to one or more data tables, or modifying a data table, then the two systems 405a, 405b will diverge. After many instances of write requests being distributed between the primary system 405a and the secondary system 405b, the two systems would be substantially different, and likely unusable. In another example, an application request, e.g. 465, may perform a write transaction that is followed by a read transaction, e.g. 455, related to the data written by the write request 465. If the write request is allocated to the primary system 405a, the read request would obtain a different result depending on whether the subsequent read transaction is carried out by the primary system 405a or by the secondary system 405b.

Load balancing in a HA/DR system, by distributing a portion of the workload of a primary data system to a hot-standby or backup system must be done in a way that does not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system must maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications.

Figure 5:
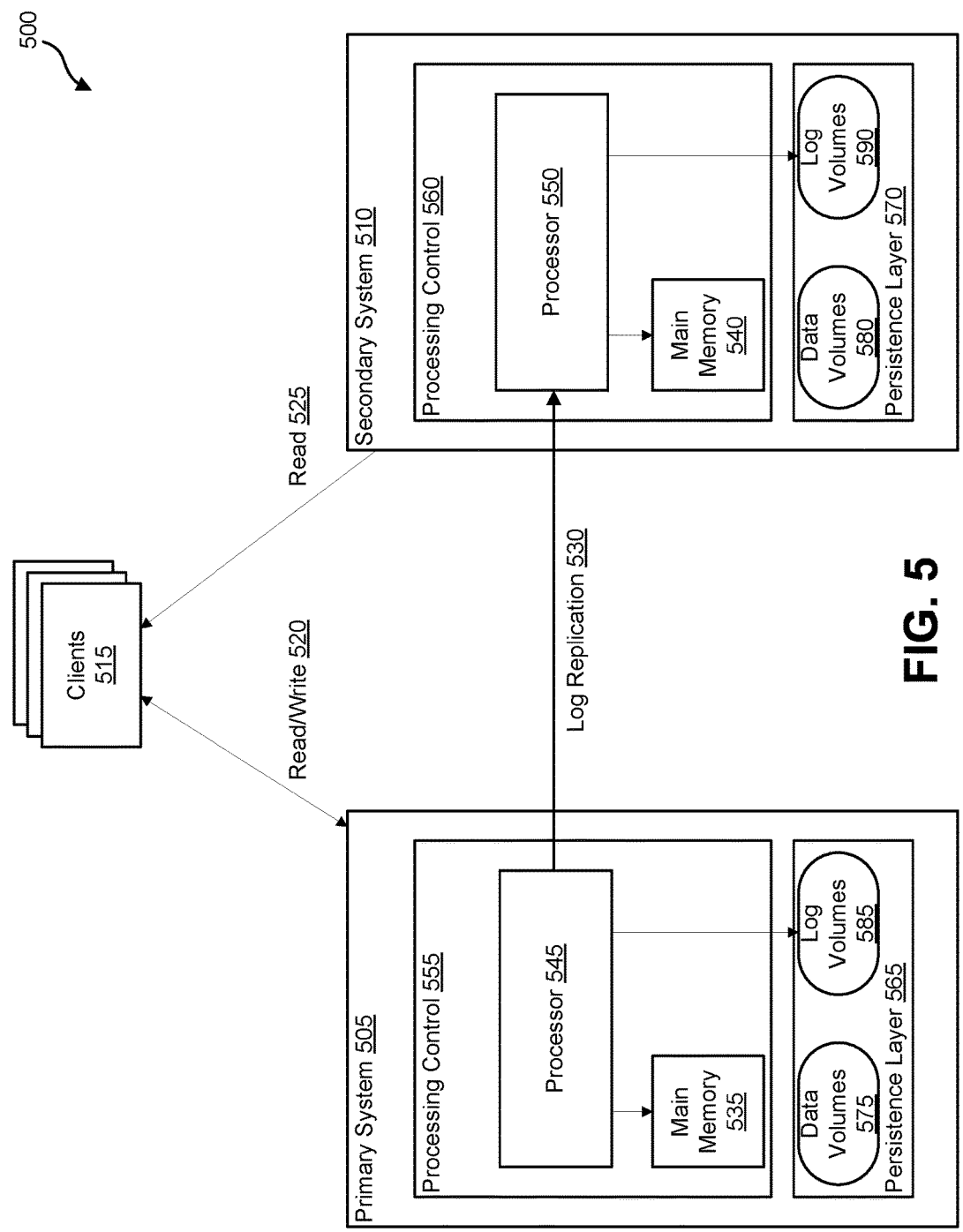
FIG. 5 is a functional flow diagram depicting one example solution to managing load balancing in a HA/DR system for use in connection with the current subject matter.

FIG. 5 depicts one possible solution to managing load balancing in a HA/DR system 500. HA/DR system 500 includes a primary system 505 and a secondary system 510 and is capable of load balancing between primary system 505 and secondary system 510 without interfering with the hot-standby functionality of the secondary system 510. Each of primary system 505 and secondary system 510 may be single instance database systems similar to database system 105 depicted in FIG. 1, or a distributed variation of database system 105 as depicted in FIG. 2. Furthermore, each of primary system 505 and secondary system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510.

A collection of clients may each maintain an open connection to both the primary system 505 and the secondary system 510. For example, client 515 maintains a read/write connection 520 to the primary system 505 and a read only connection 525 to the secondary system 510. Alternatively, client 515 may maintain a read/write connection with each of the primary system 505 and the secondary system 510, while processes within the secondary system 510 itself prohibit execution of any requests that require a write transaction upon the secondary system while it is in backup mode. Management of load balancing of the workload required by a client application executing at client 515 may be managed by the client 515 application itself. Alternatively, a client 515 application may submit a query request to the primary system 505. A process control 555 load balancing process executing on processor 545 then may determine where the query should be executed and replies to the client 515 with instructions identifying which system the client 515 should issue the query to.

Primary system 505 may include an in-memory database in which substantially all actively used data may be kept and maintained in main memory 535 so that operations can be executed without disk I/O, which requires accessing disk storage.

Active operations of applications within processing control 555 may cause processor 545 to read and write data into main memory 535 or to disk in the persistence layer 565. Processing control 555 applications can also cause processor 545 to generate transaction logs (e.g., redo log, undo log, cleanup log, etc.) for capturing data transactions upon the database, which processor 545 then persists in the log volumes 585 and data volumes 575 respectively. As substantially all actively used data may reside in-memory, processing control 555 may interact primarily with data held in main memory while only resorting to data volumes 575 for retrieving and writing less often used data. Additional processes within processing control 555 may be executed by processor 545 to ensure that in-memory data is persisted in persistence layer 565, so that the data is available upon restart or recovery.

Primary system 505 may be the primary operational system for providing the various functionality necessary to support 24/7 operations for an organization. Secondary system 510 may be a hot-standby, ready to come online with minimal recovery time so as to minimize downtime. Secondary system 510 may be an identical physical system as primary system 505, and may be configured in a substantially identical manner in order to enable the secondary system 510 to provide all the same functionality as primary system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary system 510 may also include an in-memory database kept and maintained primarily in main memory 540.

Primary system 505 and secondary system 510 differ in that all requests, from client 515 or otherwise, that require a write transaction are executed only in primary system 505. Primary system 505 and secondary system 510 further differ in that all write transactions are prohibited by the secondary system 510. In order to propagate changes to the data or the underlying schema from the primary system 505 to the secondary system 510, processor 545 also replicates 530 transaction logs directly to the process control 560 of the secondary system 510. Process control 560 includes one or more applications that cause processor 550 to then replay the transaction logs replicated from the primary system 505, thereby replaying the transactions at the secondary system 510. As transaction logs are replayed, the various transactions executed at the primary system become reflected in the secondary system 510. In order to ensure both the HA functionality and the load balancing functionality, replay of the transaction logs at the secondary system places data in main memory 540, and also persists any data committed in the primary system to persistence layer 570 to be stored by data volumes 580. Replay of the transaction logs at the secondary system 510 may also results in the transaction logs being persisted in log volumes 590.

Transaction logs (e.g., redo logs, undo logs, cleanup logs, etc.) in the log volumes 585 may be replicated in different ways. Where maintaining a standby system in as close to the same state as the primary system is an important factor, logs may be replicated synchronously meaning that the primary system will not commit a transaction until the secondary successfully responds to the log replication. Such an arrangement slows performance of the primary system. Conversely, where performance of a primary system is a priority, logs may be replicated asynchronously, in which case the primary operation proceeds with committing transactions without waiting for a response. Various tradeoffs can be made between these two scenarios to achieve a proper level of performance while ensuring replication of critical data.

It will be appreciated from the detailed description above that such a secondary system in standby mode, such as secondary system 510, can only be as current as its most recently replayed transaction logs. Transaction logs are replicated and replayed at the secondary system 510 only after a transaction executes in the primary system 505. Secondary system 510, therefore, is always slightly behind an associated primary system 515. Also, there is no guarantee that a query routed to the primary system in a load balancing effort will be executed before, during or after a particular transaction log is replayed. Thus, the state of the primary system 505 and the state of the secondary system will rarely if ever be identical. But, by addressing certain concerns, secondary system 510 may be kept in a state substantially close to the same state as the primary system 505 such that the workload required by many operations can be supported by the secondary 510.

With the HA/DR system 500, an initial copy on the primary system 505 can be shipped to the secondary system 510 that can serve as a starting point, where both the primary system 505 and the secondary system 510 have identical data, before transaction log replay commences to synchronize all future changes from the primary system 505 to the secondary system 510.

As noted above, the data of the primary system 505 (also referred to as the primary system data) can comprise data volumes 350, 575 comprising a data store together with undo and cleanup log and recovery log volumes 352, 590 comprising the recovery log. Other types of storage arrangements can be utilized depending on the desired configuration. The data store can comprise a snapshot of the corresponding database contents as of the last system savepoint. System savepoints (also known in the field of relational database servers as checkpoints) can be periodically or manually generated and provide a point at which the recovery log can be truncated.

The savepoint can, in some variations, include an undo log of transactions which were open in the savepoint and/or a cleanup log of transactions which were committed in the savepoint but not yet garbage collected (i.e., data which has been deleted by these transactions has been marked as deleted but has not been deleted in a physical manner to assure multiversion concurrency control). With conventional arrangements, the cleanup is executed before the replay of the transaction log is started (by one or more garbage collection processes that frees data which has been deleted by committed transactions, etc.). In case this cleanup log is large or consists of expensive operations it can take a considerable time to process it. This arrangements adds to the downtime of the database system as this is part of the system start up or system takeover phase.

The recovery log can comprise a log of all changes to the database contents (i.e., the database system 105, the primary database 505 and/or the secondary database 510, etc.) since the last system savepoint, such that when a database server is restarted, its latest state is restored by replaying the changes from the recovery log on top of the last system savepoint. Typically, in a relational database system, the previous recovery log is cleared whenever a system savepoint occurs, which then starts a new, empty recovery log that will be effective until the next system savepoint. While the recovery log is processed, a new cleanup log is generated which needs to be processed as soon as the commit is replayed to avoid a growing data area because of deleted but not garbage collected data.

For read access in arrangements having a primary system 505 and a secondary system 510 such as illustrated and described in connection with FIGS. 4 and 5, a read transaction needs to able to see a consistent state of the database state. This conditions requires the blocking of garbage collection processes for such data which the read transaction could potentially see. As the garbage collection processing is part of the recovery log processing this would mean to block the recovery queues which would also mean that the secondary system 510 cannot be in sync with the primary system 510 anymore, resulting in inacceptable takeover times in case of a failure of the primary system.

In contrast to arrangements in which garbage collection is initiated and potentially completed prior to replay of transactions from a transaction log and cleanup generated by the replay operation is executed right after the replay of the commit, asynchronous garbage collection can be utilized. Asynchronous garbage collection can apply to a single database such as that database system 105 as well as an arrangement in which there is a primary system 505 and a secondary system 510. In particular, for the databases 105, 505, 510 existing cleanup operations can be leveraged such that they are capable to be processed in parallel to other cleanup operations (e.g. cleanups created by DML and DDL database operations) or recovery log replay operations. Proper locks can be taken on data where necessary and the cleanup log can be extended to achieve this purpose when required.

A version assigned to a persistent cleanup log written during transaction log replay can be made to distinguish it from a cleanup log written by older database versions and thus cannot be processed asynchronously. This arrangement allows the cleanup log to be backwards compatible and for starting from old backups written by previous database versions.

The garbage collection processes (i.e., processes required to implement cleanup operations specified by the cleanup log) can be executed by cleanup queues that are different from queues executing any replay operations. In some cases, each processor executes a single replay queue for replay and a single cleanup queue for cleanup. Such processors can form part of a single computing device or they may be distributed across different computing devices. Further, in some variations, execution of the operations in the replay queue can take priority over execution of the cleanup operations.

In some cases, a history manager (which can be a dedicated application or a process/series of processes, etc.) can oversee assignment and execution of the replay queues and cleanup queues by the respective processors. The cleanup queues can be processed such that older versions of cleanup logs are processed in a sequential manner while new version of cleanup logs can be processed in parallel on separate cleanup queues.

As part of a database system recovery/restart, after the savepointed state of data is restored, and before processing of the recovery log commences, all cleanup logs can be iterated through and, in implementations using a history manager, passed to the history manager for asynchronous garbage collection processing.

In addition, it can be checked if there are older versions of the cleanup log present in the savepoint which need to be processed synchronously with regard to the recovery log. In such cases, recovery log processing can wait until garbage collection of old versions of cleanup logs finish. However, recovery log processing can commence when there are newer versions of cleanup logs for garbage collection. In cases in which no old versions of cleanup logs exist, recovery log replay can start immediately after the cleanup log from the savepoint has been passed to the history manager.

For crash recovery for a single database such as database system 105, during system restart during transaction log replay, any cleanup log generated by the replay operations can be passed to the history manager for asynchronous garbage collection processing after replay of the corresponding commit. Although this garbage collection cannot be blocked as there will be never a read transaction in this phase, replay will be faster as the garbage collection processing is offloaded from the recovery queues and can be continued in the background while the database can go online after recovery log processing finished. This improves database startup time in case recovery log replay generates a lot of cleanup operations.

For an arrangement in which there are multiple database systems such as a primary system 505 and a secondary system 510 as illustrated in diagram 500 FIG. 5, as part of system restart during transaction log replay, any cleanup log generated by the replay operations can be passed to the history manager for asynchronous garbage collection processing after replay of commit. In case read transactions are present, the history manager can check if cleanup can be processed based on the snapshot timestamp of the oldest reader and the commit timestamp of the transaction which has written the corresponding cleanup log. In case the commit timestamp of the cleanup log is older than the snapshot timestamp of the oldest reader the cleanup can be processed and then deleted (by a garbage collection process). Otherwise, the corresponding cleanup log can be kept and reevaluated the next time by the history manager. In cases in which the secondary system 510 takes over from the primary system 505, the secondary system 510 can go online (i.e., become active, etc.) right after the last recovery log sent from the primary is processed but without waiting for the cleanup to be processed at the secondary system 510 as this situation is similar to the database restart case.

Figure 6:
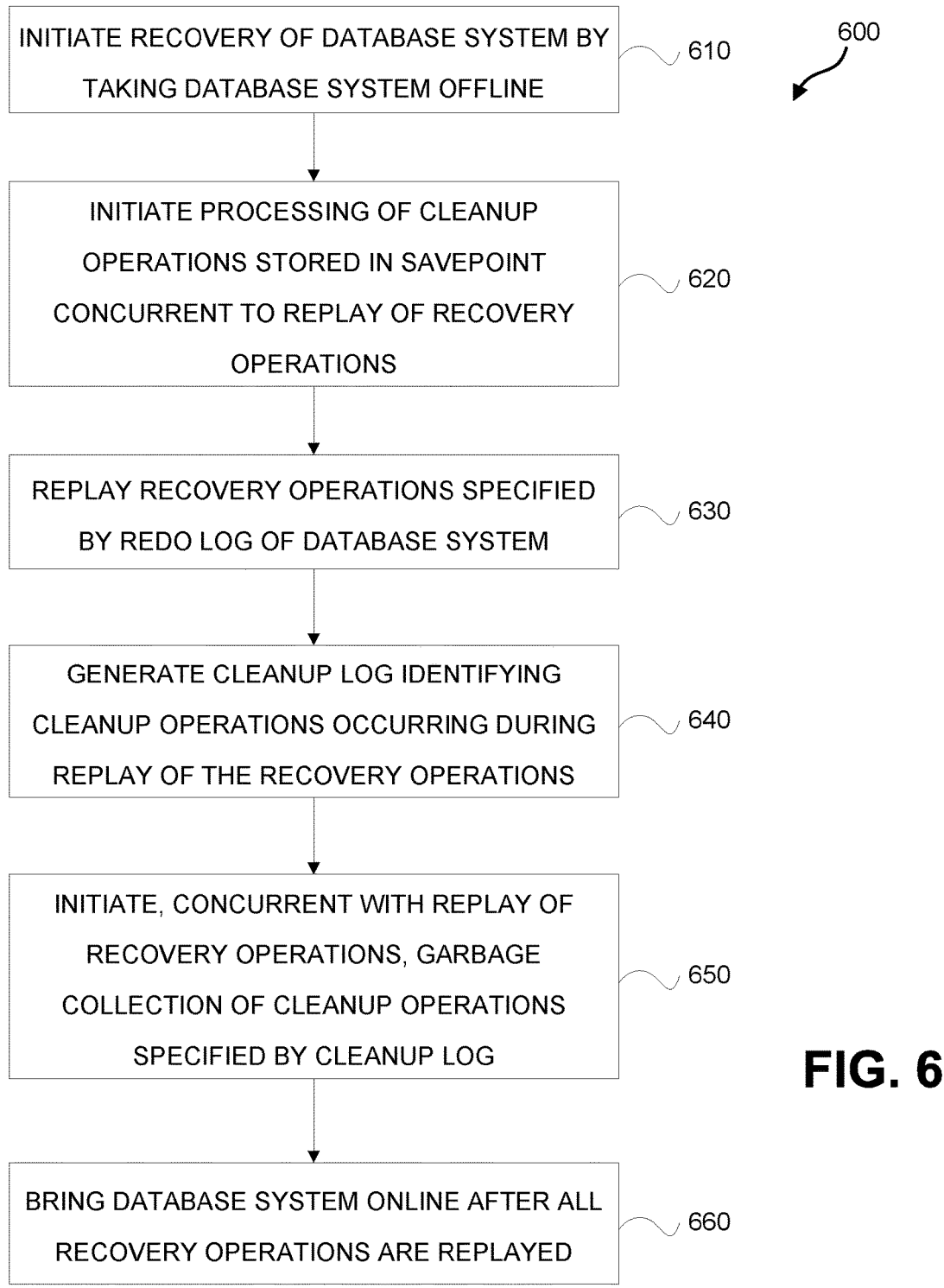
FIG. 6 is a process flow diagram illustrating asynchronous garbage collection as part of redo operations in a database system.

FIG. 6 is a process flow diagram illustrating an arrangement in which, at 610, recovery of a database system is initiated by taking the database system offline. Then, at 620, cleanup log present in the savepoint is passed to the history manager for asynchronous processing. Thereafter, at 630, recovery operations specified by a redo log of the database system are replayed. Further, at 640, a cleanup log identifying cleanup operations occurring during the replay of the recovery operations for garbage collection is generated. Garbage collection of the cleanup operations specified by the cleanup log can, at 650, be initiated concurrent with the replay of the recovery operations. The database can, at 660, be brought online after all of the recovery operations are replayed.

Figure 7:
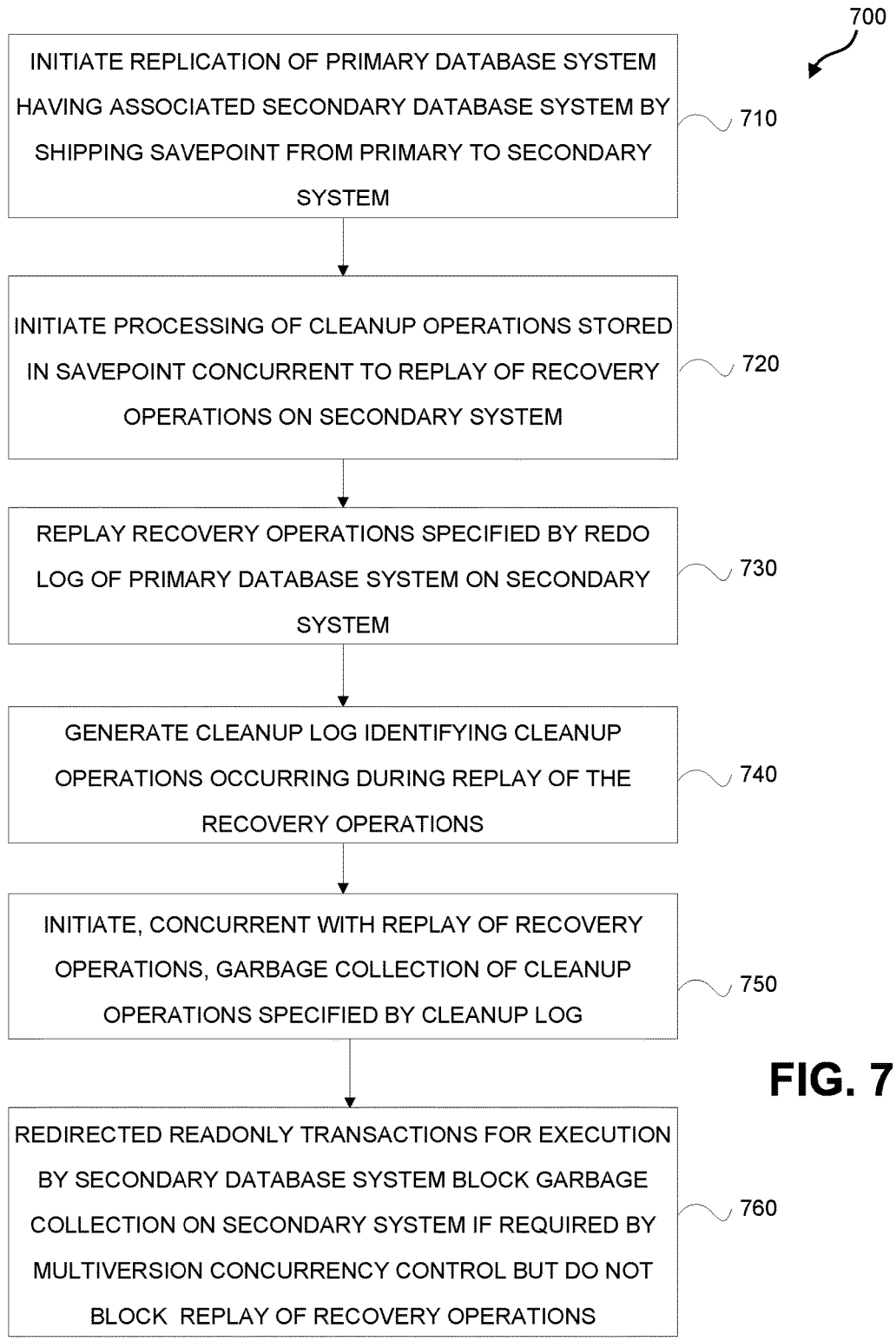
FIG. 7 is a process flow diagram illustrating asynchronous garbage collection in a read enabled secondary database system as part of the redo operations based on recovery log sent from the primary system.

FIG. 7 is a process flow diagram illustrating an arrangement in which, at 710, replication of a primary database system is initiated by mirroring the current database state to the associated secondary database system (e.g. by shipping the last savepoint from the primary to the secondary database system). The secondary system is not online but in read enabled replication mode where recovery log sent from the primary can be processed and read transactions are allowed but no write transactions. In case the shipped savepoint contains cleanup log, the secondary system will pass the cleanup log to the history manager for asynchronous garbage collection at 720. Thereafter, at 730, the primary database system replays recovery operations specified by a redo log of the primary database system. The secondary database system generates, at 740, a cleanup log identifying cleanup operations occurring during the replay of the recovery operations for garbage collection. Concurrent with the replay of the recovery operations, at 750, the secondary database system initiates garbage collection of the cleanup operations. Further, at 760, readonly transactions for execution by the primary database system are redirected to the secondary database. The readonly transactions executed on the secondary system may now, depending on the data to be read, block the asynchronous garbage collection of the secondary in order to guarantee a stable view on the data as e.g. required by transaction isolation level 'snapshot' or 'repeatable read'. At the same time the primary system may execute asynchronous garbage collection as in the single instance case as cleanup log is not shipped by the recovery log but instead re-created by the recovery operation on the secondary database and executed completely independent from the primary system.

The database system 105 can have any technical parameters to control the behavior of the system. Given that installations of the database system 105 can vary greatly, so do the optimal technical parameters making it complex for customers and consultants to configure the systems. In addition to system load varying, virtual machines system resources can also vary. Therefore, technical parameters that describe the system behaviors should be used when possible and technical parameters for software components should be determined automatically based on intended behaviors and measured system behavior/statistics.

One option is to parallelize the garbage collection by having a number of parallel garbage collector jobs to run. This number can, for example, be set as a default to number of processor cores. However, this type of an arrangement can be problematic. First of all, virtual machine CPU resource consumption can significantly vary. Second, blocking garbage collection for an extended period as part of a long running transaction can cause many garbage collectors to start running the moment the blocking situation is dissolved. This arrangement, in turn, causes high CPU load with negative impact to running user transactions.

Figure 8:
FIG. 8 is a process flow diagram illustrating increasing or decreasing asynchronous garbage collection based on thresholds.

Rather than have a static assignment of the resource allocation, with the current subject matter, the number of parallel running garbage collector threads can be determined based on available resources and/or an amount of garbage for collection. With reference to diagram 800 of FIG. 8, at 810, garbage collection of objects in a database system is initiated using a plurality of garbage collection threads. Such garbage collection can, for example, be part of the asynchronous techniques described herein and/or as part of a different garbage collection technique. Further, the garbage collection can be used with the primary database system and secondary database system arrangement described above. During garbage collection, at 820, processor resource usage can be monitored. More garbage collectors can be added, at 830, if the monitored processor usage is below a first pre-defined threshold. In addition, at 840, a current number of garbage collector threads can be decreased if the monitored processor usage is above a second threshold. In some cases, the current number of garbage collector threads can be maintained if an amount of garbage for collection is below a pre-defined amount and/or if an amount of garbage for collection is not increasing.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   initiating recovery of a database system by taking the database system offline;
   replaying recovery operations specified by a redo log of the database system;
   generating a cleanup log identifying cleanup operations occurring during the replay of the recovery operations requiring garbage collection;
   initiating, concurrent with at least one of the startup of the database or the replay of the recovery operations, garbage collection of the cleanup operations as specified in a last database savepoint or by the cleanup log, the garbage collection being implemented by a plurality of garbage collection threads;
   monitoring processor usage of the database system in connection with and during the garbage collection;
   adding, during the garbage collection, more garbage collector threads if the monitored processor usage is below a first pre-defined threshold;
   decreasing, during the garbage collection, a current number of garbage collector threads if the monitored processor usage is above a second threshold; and
   bringing the database system online after all of the recovery operations are replayed;
   wherein:
      the replay operations are executed by recovery threads and the cleanup operations are executed by garbage collection threads; and
      the database system comprises a plurality of programmable processor cores and the threads are striped such that each core executes a maximum of one recovery thread and one garbage collection thread.

2. The computer-implemented method of claim 1 further comprising:
   maintaining the current number of garbage collector threads if an amount of garbage for collection is below a pre-defined amount.

3. The computer-implemented method of claim 1, further comprising:
   maintaining the current number of garbage collector threads if an amount of garbage for collection is not increasing.

4. The computer-implemented method of claim 1, wherein the cleanup log is passed to a history manager after it is generated and the history manager subsequently initiates the garbage collection of the cleanup operations specified by the cleanup log.

5. The computer-implemented method of claim 1, wherein the garbage collection of the cleanup operations continues subsequent to the database system being brought online.

6. The computer-implemented method of claim 1, wherein at least one core prioritizes execution of the corresponding recovery thread over the corresponding garbage collection thread.

7. The computer-implemented method of claim 1, wherein the database system comprises an in-memory database storing data in main memory.

8. A system comprising:
   at least one data processor; and
   memory storing instructions, which when executed by the at least one data processor, result in operations comprising:
      initiating recovery of a database system by taking the database system offline;
      replaying recovery operations specified by a redo log of the database system;
      generating a cleanup log identifying cleanup operations occurring during the replay of the recovery operations requiring garbage collection;
      initiating, concurrent with at least one of the startup of the database or the replay of the recovery operations, garbage collection of the cleanup operations as specified in a last database savepoint or by the cleanup log, the garbage collection being implemented by a plurality of garbage collection threads;
      monitoring, during garbage collection, processor usage of the database system in connection with the garbage collection;
      adding, during garbage collection, more garbage collector threads if the monitored processor usage is below a first pre-defined threshold;
      decreasing, during garbage collection, a current number of garbage collector threads if the monitored processor usage is above a second threshold; and
      bringing the database system online after all of the recovery operations are replayed;
   wherein:
      the replay operations are executed by recovery threads and the cleanup operations are executed by garbage collection threads; and
      the database system comprises a plurality of programmable processor cores and the threads are striped such that each core executes a maximum of one recovery thread and one garbage collection thread.

9. The system of claim 8, wherein the operations further comprise:
   maintaining the current number of garbage collector threads if an amount of garbage for collection is below a pre-defined amount.

10. The system of claim 8, wherein the operations further comprise:
    maintaining the current number of garbage collector threads if an amount of garbage for collection is not increasing.

11. The system of claim 8, wherein the cleanup log is passed to a history manager after it is generated and the history manager subsequently initiates the garbage collection of the cleanup operations specified by the cleanup log.

12. The system of claim 8, wherein the garbage collection of the cleanup operations continues subsequent to the database system being brought online.

13. The system of claim 8, wherein at least one core prioritizes execution of the corresponding recovery thread over the corresponding garbage collection thread.

14. The system of claim 8 further comprising the database system, wherein the database system comprises an in-memory database storing data in main memory.

15. A non-transitory computer program product storing instructions, which when executed by at least one data processor, result in operations comprising:
 initiating recovery of a database system by taking the database system offline;
 replaying recovery operations specified by a redo log of the database system;
 generating a cleanup log identifying cleanup operations occurring during the replay of the recovery operations requiring garbage collection;
 initiating, concurrent with at least one of the startup of the database or the replay of the recovery operations, garbage collection of the cleanup operations as specified in a last database savepoint or by the cleanup log, the garbage collection being implemented by a plurality of garbage collection threads;
 monitoring, during garbage collection, processor usage of the database system in connection with the garbage collection;
 adding, during garbage collection, more garbage collector threads if the monitored processor usage is below a first pre-defined threshold;
 decreasing, during garbage collection, a current number of garbage collector threads if the monitored processor usage is above a second threshold; and
 bringing the database system online after all of the recovery operations are replayed,
 wherein:
  the replay operations are executed by recovery threads and the cleanup operations are executed by garbage collection threads; and
  the database system comprises a plurality of programmable processor cores and the threads are striped such that each core executes a maximum of one recovery thread and one garbage collection thread.

16. The computer program product of claim 15, wherein the operations further comprise:
 maintaining the current number of garbage collector threads if an amount of garbage for collection is below a pre-defined amount.

17. The computer program product of claim 15, wherein the operations further comprise:
 maintaining the current number of garbage collector threads if an amount of garbage for collection is not increasing.

18. The computer program product of claim 15, wherein the cleanup log is passed to a history manager after it is generated and the history manager subsequently initiates the garbage collection of the cleanup operations specified by the cleanup log.

19. The computer program product of claim 15, wherein the garbage collection of the cleanup operations continues subsequent to the database system being brought online.

20. The computer program product of claim 15, wherein at least one core prioritizes execution of the corresponding recovery thread over the corresponding garbage collection thread.

\* \* \* \* \*